E. T. MOLYNEUX.
HOG CATCHER AND CARRIER.
APPLICATION FILED APR. 21, 1920.
1,359,905.
Patented Nov. 23, 1920.
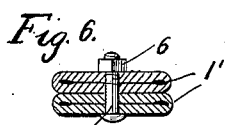
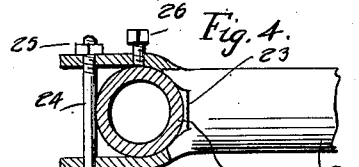
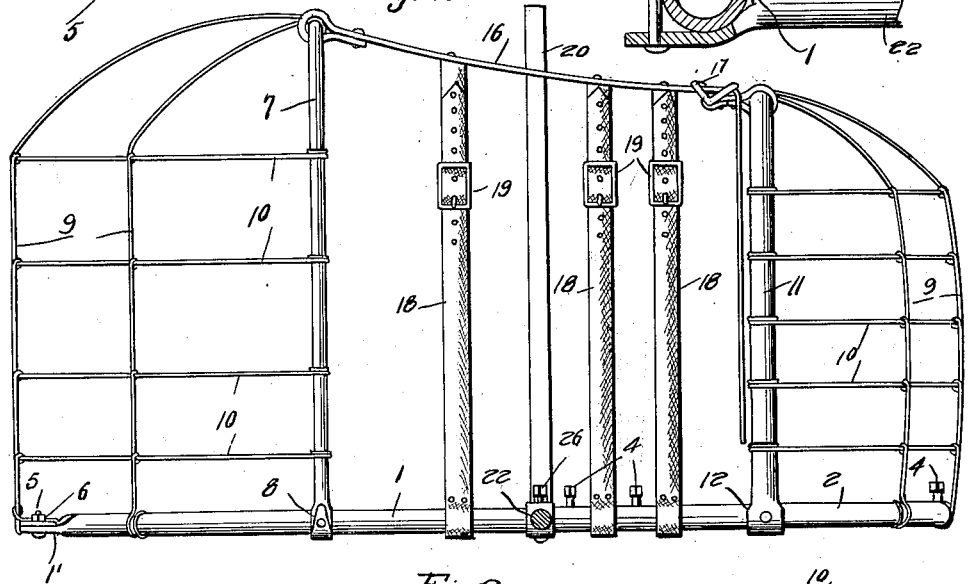
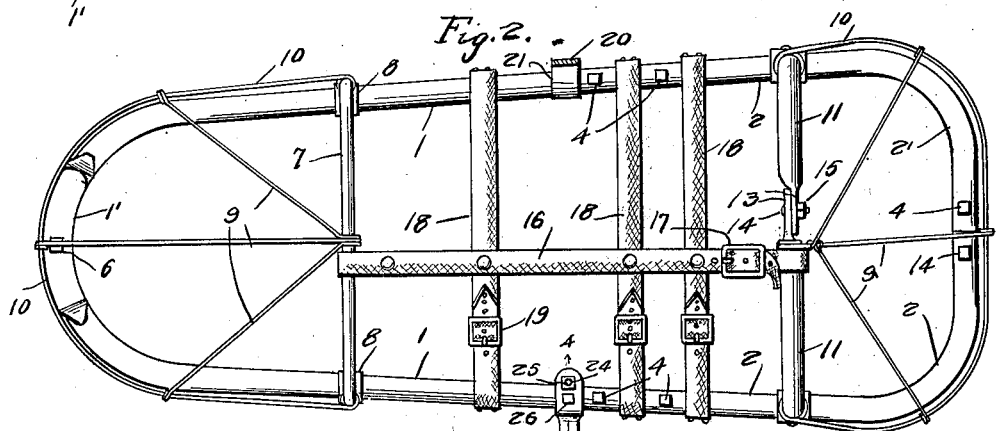
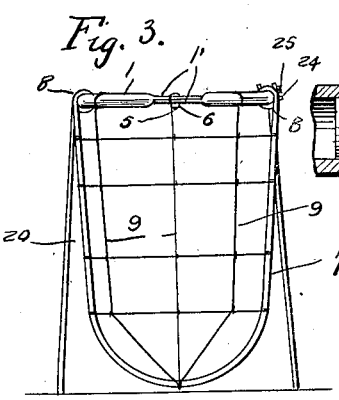
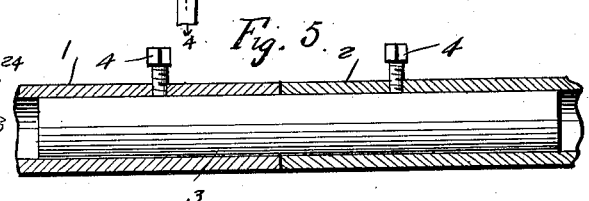
Inventor
E. T. Molyneux.

UNITED STATES PATENT OFFICE.

ENOCH T. MOLYNEUX, OF GRACE CITY, NORTH DAKOTA.

HOG CATCHER AND CARRIER.

1,359,905.  Specification of Letters Patent.  Patented Nov. 23, 1920.

Application filed April 21, 1920. Serial No. 375,628.

*To all whom it may concern:*

Be it known that I, ENOCH T. MOLYNEUX, a citizen of the United States, residing at Grace City, in the county of Foster and State of North Dakota, have invented certain new and useful Improvements in Hog Catchers and Carriers; and I do hereby declare the following to be a full, clear, and exact description of the invention, such as will enable others skilled in the art to which it appertains to make and use the same.

This invention relates to certain new and useful improvements in hog catchers and carriers and has for its primary object the provision of a hog catcher and carrier of simple construction, easy to handle and highly efficient in use.

The invention has for another object, the provision of a hog catcher and carrier which may be readily adjusted so as to be employed for catching and carrying hogs of different sizes, thereby eliminating the necessity of having several different sizes of the device.

The invention has for a still further object, the provision of a hog catcher and carrier composed of the minimum number of parts and which may be readily inverted and supported by the supporting leg and handle with the animal therein or carried in inverted position without danger of the animal escaping.

The invention has for another object, the provision of a hog catcher and carrier of the character stated which will be of such construction as to conform in a general manner to the shape of the animal so that it may be readily placed over the animal without danger of hurting the latter.

With the foregoing and other objects in view, as will appear as the description proceeds the invention consists in the novel construction, combination and arrangement of coöperating elements as hereinafter more specifically set forth, claimed and pointed out in the drawings in which—

Figure 1 is an elevation of the complete device.

Fig. 2 is a top plan view thereof.

Fig. 3 is an end elevation with the device in inverted position.

Fig. 4 is an enlarged detail sectional view on the line 4—4 of Fig. 2.

Fig. 5 is an enlarged detail section showing one of the joints of the front section for adjustment of the device, and Fig. 6 is an enlarged detail section through the joint at the forward end of the frame.

Referring more in detail to the drawings, in which similar reference characters designate corresponding parts throughout the several views, 1 indicates the forward main frame member and 2 the rear frame member forming the main frame of the device. The sides of the main frame are formed by one forward frame member 1 and one rear frame member 2 which are connected by an inner connecting rod 3 extending into the opposed ends thereof, the frame members 1 and 2 being hollow and carrying set screws 4 bearing upon the rod 3 to retain the frame members 1 and 2 on each side in proper adjusted relation with respect to one another and thereby govern the length of the device. The forward frame members 1 at each side have their forward ends curved gradually and overlapped as shown at 1' and also flattened, as clearly shown in Figs. 2 and 6 of the drawings. The overlapped and flattened forward extremities of the forward main frame member 1 form the front end of the main frame and are pivotally connected by the pivot bolt 5 passed therethrough and having a suitable nut 6 upon its upper end. The rear frame members 2 also have their rear ends curved toward one another as shown at 2' and connected by a connecting bar 3 fitted into the opposed end thereof the same as the frame members 1 and 2. In this case set screws 4 are also provided for bearing engagement upon the rod 3 at the rear end of the frame to hold the curved end 2' in proper adjusted position. By adjusting the end 2' of the frame members with respect to one another, the side frame members may be swung upon the pivot bolt 5 at the forward end of the frame to adjust the width of the frame as desired.

It will be understood that the entire main frame is formed of hollow members such as piping and the rear end is considerably wider than the forward end, which latter is curved, as clearly shown in Fig. 2 of the drawings. A forward arch or upstanding frame 7 is provided at the ends of the forward frame members 1, as shown in Figs. 1 and 2 of the drawings. This arch or upstanding frame member 7 is of substantially U-shape form with its opposite lower ends secured upon the forward frame members 1, as shown at 8. The forward arch or frame member 7 is also preferably formed of tubing. Forwardly and downwardly extended wire strands 9 are connected with the center of the forward arch or frame 7 and diverge as they extend downwardly to connect their lower ends with the forward curved portions of the forward frame members 1. These strands 9 are also connected by horizontal wire strands 10 having their opposite ends secured to the upstanding or vertical portions of the forward arch or frame member 7, thereby forming a forward wire section for the device.

A rear arch or frame member 11 is provided and formed into sections with the lower ends of the section secured to the rear frame member 2 intermediate the ends thereof, as shown at 12. This rear arch or frame member 11 is considerably lower than the forward arch or frame member 7 and has the upper ends of its section turned and flattened, as shown at 13. These flattened ends 13 are overlapped, as shown in Fig. 2 of the drawings and the pivot pin 14 extended therethrough with a suitable nut or the like mounted upon one end. This forms a joint which will permit of ready spreading of the rear end of the device when adjusting the main frame transversely to accommodate the smaller or larger hogs or the like.

The upper longitudinal flexible member 16 connects the central portion of the forward arch or upstanding frame 7 and the rear arch or upstanding frame 11 and this member is preferably of the form of a strap with the buckle 17 or other means by which the flexible member 16 may be readily adjusted. Secured at spaced points along the length of the flexible member 16 are transverse flexible members 18 which are also adjustable by means of buckles 19 or the like and which have their opposite ends secured to the forward frame members 1 and rear frame members 2, as shown in the drawings. This provides a flexible central portion for the device and which is essential to prevent injury to the animal.

A supporting leg 20 is secured rigidly to one of the forward frame members 1 adjacent the inner end thereof or the connection of this member with the corresponding and alined rear frame member 2, as shown at 21, the leg 20 extending upwardly when the device is in upright or normal position. A handle 22 is mounted on the opposite forward frame member 1 at a point opposite the leg 20 and this handle 22 is preferably formed of a hollow member such as the member used for forming the main frame while the leg 20 is preferably formed of the flat member such as strap iron. The handle 22 may either be hollow or solid as shown in Fig. 1 of the drawings. The inner end of the handle 22 is bifurcated, however, as shown at 23 in Fig. 4 of the drawings and extended upon opposite sides of the forward frame member 1 and then connected by a clamping bolt 24 passed through the separated portions of the bifurcated end of the handle 22, as shown in detail in Fig. 4 of the drawings, a nut or the like 25 being mounted on the clamping bolt 24 to draw together the separated parts of the handle end. This handle may be secured at any angle with respect to the device, that is on an incline or a horizontal position, by means of a set screw 26 carried in the bifurcated end of the handle 22 and bearing upon the forward frame member 1. Any other suitable means for retaining the handle in adjusted position may be employed, if desired.

When it is desired to employ this device for catching a hog or the like, the handle is secured in the desired position and the device then placed over the animal to completely inclose him and then the device with the animal therein may be readily and quickly inverted and supported in position, as shown in Fig. 3 of the drawings, the handle being loosened and turned to coöperate with the leg 20 in supporting the device in inverted position. It will be evident that the device with the animal therein may be carried from place to place, as desired, or the device left in inverted position as shown in Fig. 3 without danger of the animal escaping therefrom.

While the preferred embodiment of the invention has been shown and described, it will be understood that minor changes in the details of construction and arrangement of parts may be resorted to within the scope of what is claimed without departing from the spirit of the invention or sacrificing any of the advantages thereof.

What is claimed is:—

1. A hog catcher and carrier comprising a longitudinally tapered main frame, forward and rear frame sections mounted on said main frame, flexible connections between said forward and said rear frame sections, a supporting leg carried on one side of said main frame and a handle mounted on the opposite side of said main frame.

2. A hog catcher and carrier comprising a main frame having a flared rear end and formed of adjustable sections, a forward frame section mounted on said main frame, a rear frame section mounted on said main frame, flexible connecting members between frame, said forward and rear frame sections, a supporting leg mounted on one side of said main frame and normally held upwardly, and a handle adjustably mounted upon the opposite side of said main frame.

3. A hog catcher and carrier comprising a main frame formed of forward pivoted frame members, rear frame members adjustably connected to said forward frame member and to one another, and means for adjustably connecting the parts of said main frame, in combination with the forward frame section mounted upon said main frame and extended upwardly therefrom, a comparatively lower rear frame section mounted on said main frame and extending upwardly therefrom, adjustable flexible members between said forward and rear frame sections to form a flexible body central portion for said hog catcher and carrier, a supporting leg for said hog catcher and carrier, and handle for said main frame.

4. A hog catcher and carrier comprising a main frame having a comparatively narrow forward end and a comparatively wide rear end, said main frame being adjustable longitudinally and transversely, forward and rear arched members mounted on said main frame, connections between said forward and rear arched members and the forward and rear ends of said main frame forward and rear frame sections above said main frame, a flexible frame section formed of connected strap members between said forward and rear sections and connected therewith, an upstanding leg carried by said main frame to support said main frame when inverted, an adjustable handle carried by said main frame and adapted to coöperate with said leg in supporting said main frame in inverted position, and means for securing said handle in adjusted position upon said main frame.

In testimony whereof I affix my signature in presence of two witnesses.

ENOCH T. MOLYNEUX.

Witnesses:
  O. Ramsland.
  Geo. T. Guay.